United States Patent
Wallace et al.

(10) Patent No.: US 11,537,428 B2
(45) Date of Patent: Dec. 27, 2022

(54) ASYNCHRONOUS EXECUTION OF CREATIVE GENERATOR AND TRAFFICKING WORKFLOWS AND COMPONENTS THEREFOR

(71) Applicant: Spotify AB, Stockholm (SE)

(72) Inventors: Stacey Ling-Fun Wallace, New York, NY (US); Noel E. Cody, Brooklyn, NY (US); Christopher S. Carpita, Jersey City, NJ (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/414,368

(22) Filed: May 16, 2019

(65) Prior Publication Data

US 2019/0354396 A1   Nov. 21, 2019

Related U.S. Application Data

(60) Provisional application No. 62/672,817, filed on May 17, 2018.

(51) Int. Cl.
| | |
|---|---|
| *G06F 9/46* | (2006.01) |
| *G06F 9/48* | (2006.01) |
| *G06F 16/41* | (2019.01) |
| *G06F 9/54* | (2006.01) |
| *G06F 9/50* | (2006.01) |

(52) U.S. Cl.
CPC .............. *G06F 9/48* (2013.01); *G06F 9/544* (2013.01); *G06F 9/546* (2013.01); *G06F 16/41* (2019.01); *G06F 9/4881* (2013.01); *G06F 9/5038* (2013.01)

(58) Field of Classification Search
CPC . G06F 9/48; G06F 16/41; G06F 9/544; G06F 9/546; G06F 9/4881; G06F 9/5038
See application file for complete search history.

(56) References Cited

U.S. PATENT DOCUMENTS

| | | | |
|---|---|---|---|
| 8,046,797 | B2 | 10/2011 | Bentolila |
| 3,521,679 | A1 | 8/2013 | Churchill et al. |
| 8,750,843 | B2 | 6/2014 | Forrester et al. |

(Continued)

FOREIGN PATENT DOCUMENTS

| | | |
|---|---|---|
| CN | 104506964 A1 | 4/2015 |
| EP | 2410444 A2 | 1/2012 |

OTHER PUBLICATIONS

Oracle, JD Edwards EnterpriseOne Tools Workflow Tools Guide, Oracle, Mar. 2011, 166 pages.*

(Continued)

*Primary Examiner* — Diem K Cao
(74) *Attorney, Agent, or Firm* — Merchant & Gould P.C.

(57) ABSTRACT

A creative development platform includes an input interface that receives input data defining creative properties; a workflow definition store that stores creative generation workflow definitions defining a workflow related to generating a creative; a creative generation server, communicatively coupled to the workflow definitions store, to (i) receive the input data, (ii) retrieve at least one of the creative generation workflow definitions from the workflow definition store based on the input data, and (iii) generate the creative containing one or more media objects based on the input data and using the at least one workflow definition; and a network communications device operable to communicate the creative to target devices.

17 Claims, 5 Drawing Sheets

(56) References Cited

U.S. PATENT DOCUMENTS

| | | | |
|---|---|---|---|
| 9,002,100 B2 | 4/2015 | Lecerf | |
| 9,026,577 B1* | 5/2015 | Johnston | G06Q 10/0633 |
| | | | 709/202 |
| 9,087,332 B2 | 7/2015 | Bagherjeiran | |
| 9,245,280 B2 | 1/2016 | Zheng et al. | |
| 9,355,627 B2 | 5/2016 | Ales | |
| 9,397,969 B2 | 7/2016 | Torrenegra et al. | |
| 9,646,249 B2 | 5/2017 | Corrada-Emmanuel | |
| 9,711,179 B2 | 7/2017 | Axen et al. | |
| 9,721,321 B1 | 8/2017 | Nayeri | |
| 9,721,551 B2 | 8/2017 | Silverstein | |
| 10,147,041 B2 | 4/2018 | Gao | |
| 9,959,557 B2 | 5/2018 | Bharath et al. | |
| 10,037,121 B2 | 7/2018 | Shen | |
| 10,392,022 B1 | 8/2019 | Rau | |
| 10,528,977 B1 | 1/2020 | Jogia et al. | |
| 10,553,316 B1 | 2/2020 | Neumann | |
| 10,657,556 B1* | 5/2020 | Lu | G06N 20/00 |
| 2006/0075430 A1 | 4/2006 | Park | |
| 2006/0075443 A1 | 4/2006 | Eckert | |
| 2007/0120975 A1 | 5/2007 | Tsai et al. | |
| 2008/0249855 A1 | 10/2008 | Collins et al. | |
| 2009/0150445 A1 | 6/2009 | Herberger et al. | |
| 2011/0191170 A1 | 8/2011 | Zhang et al. | |
| 2011/0196751 A1* | 8/2011 | Steelberg | G06Q 20/123 |
| | | | 705/14.73 |
| 2011/0225565 A1* | 9/2011 | van Velzen | G06Q 10/06 |
| | | | 717/114 |
| 2011/0231257 A1 | 9/2011 | Winters | |
| 2011/0243344 A1 | 10/2011 | Bakalos et al. | |
| 2012/0158452 A1* | 6/2012 | Shafiee | G06Q 10/06316 |
| | | | 705/7.26 |
| 2012/0269436 A1 | 10/2012 | Mensink | |
| 2013/0124298 A1 | 5/2013 | Li et al. | |
| 2014/0029839 A1 | 1/2014 | Mensink | |
| 2014/0046777 A1 | 2/2014 | Markey | |
| 2014/0279032 A1 | 9/2014 | Roever et al. | |
| 2015/0106825 A1* | 4/2015 | Abbas | G06F 9/546 |
| | | | 719/318 |
| 2015/0220853 A1 | 8/2015 | Marcheret | |
| 2015/0332341 A1 | 11/2015 | Gadoury et al. | |
| 2015/0356136 A1 | 12/2015 | Joshi | |
| 2015/0379224 A1 | 12/2015 | Rosen | |
| 2016/0180247 A1 | 6/2016 | Li | |
| 2016/0315722 A1 | 10/2016 | Holman | |
| 2016/0371122 A1* | 12/2016 | Nair | G06F 9/46 |
| 2016/0379274 A1 | 12/2016 | Irwin et al. | |
| 2017/0017886 A1 | 1/2017 | Gao | |
| 2017/0052954 A1 | 2/2017 | State | |
| 2017/0099592 A1 | 4/2017 | Loeb et al. | |
| 2017/0132528 A1 | 5/2017 | Aslan | |
| 2017/0161590 A1 | 6/2017 | Boulkenafed | |
| 2017/0177135 A1 | 6/2017 | Sarin | |
| 2017/0364771 A1 | 12/2017 | Pinheiro | |
| 2018/0012236 A1 | 1/2018 | Zhua | |
| 2018/0158093 A1 | 6/2018 | Szirtes | |
| 2018/0218407 A1 | 8/2018 | He | |
| 2018/0225721 A1 | 8/2018 | Bharath et al. | |
| 2018/0232528 A1 | 8/2018 | Williamson | |
| 2018/0260857 A1 | 9/2018 | Kar et al. | |
| 2018/0308133 A1* | 10/2018 | Geist, Jr. | G06Q 30/0271 |
| 2018/0336457 A1 | 11/2018 | Pal | |
| 2018/0337798 A1 | 11/2018 | Ilic | |
| 2018/0341990 A1* | 11/2018 | Bardin | G06Q 30/0273 |
| 2019/0007508 A1 | 1/2019 | Xu | |
| 2019/0130226 A1* | 5/2019 | Guo | G06K 9/6298 |
| 2019/0156210 A1 | 5/2019 | He | |
| 2019/0188561 A1 | 6/2019 | Tang | |
| 2019/0228766 A1 | 7/2019 | White et al. | |
| 2019/0243547 A1* | 8/2019 | Duggal | G06F 3/0619 |
| 2019/0244257 A1* | 8/2019 | Goldman | G06Q 30/08 |
| 2019/0250891 A1 | 8/2019 | Kumar | |
| 2019/0355024 A1 | 11/2019 | Han | |
| 2019/0355372 A1 | 11/2019 | Bittner | |
| 2020/0126111 A1 | 4/2020 | Szirtes | |
| 2020/0193603 A1 | 6/2020 | Golden | |
| 2022/0114620 A1 | 4/2022 | Han | |

OTHER PUBLICATIONS

Hector Garcia-Molina et al. "Sagas", Princeton University, Princeton, NJ, US, 16/3, pp. 249-259 (Dec. 1987).

Judith C. Brown "Calculation of a constant Q spectral transform", Accoustical Society of America, US, 89/1, pp. 425-434 (Jan. 1991).

M.M. Rahman Siddiquee, M.S. Rahman, N. Haider, R.M. Rahman, S.U.I. Chowdhury and S. Banik, "A personalized music discovery service based on data mining," 2015 IEEE/ACIS 14th Int'l Conf. on Computer and Info. Science (ICIS), Las Vegas, NV, 2015, pp. 253-258, doi: 10.1109/ICIS. (Year: 2015).

A Chen and M.A. Hasegawa-Johnson, "Mixed Stereo Audio Classification Using a Stereo-Input Mixed-to-Panned Level Feature," in IEEE/ACM Transactions on Audio, Speech, and Language Processing, vol. 22, No. 12, pp. 2025-2033, Dec. 2014, doi: 10.1109/TASLP.2014.2359628. (Year: 2014).

S. Ali and P. Aarabi, "A Cyclic Interface for the Presentation of Multiple Music Files," in IEEE Transactions on Multimedia, vol. 10, No. 5, pp. 780-793, Aug. 2008, doi: 10.1109/TMM.2008.922848. (Year: 2008).

Herzi, Saida, "System for Enabling Audio Delivery of Internet Content," An IP.com Prior Art Database Technical Disclosure, IP.com Electronic Pub. Date: Jan. 29, 2003 (Year: 2003).

\* cited by examiner

ASYNCHRONOUS EXECUTION OF CREATIVE GENERATOR AND TRAFFICKING WORKFLOWS AND COMPONENTS THEREFOR

CROSS REFERENCE TO RELATED APPLICATIONS

This application claims priority to, and the benefit of, U.S. Provisional Patent Application Ser. No. 62/672,817, filed May 17, 2018, which is hereby incorporated by reference in its entirety.

TECHNICAL FIELD

Example aspects described herein relate generally to creative generation and creative trafficking systems, and in particular to a system, a method, an apparatus and a non-transitory computer-readable storage medium for asynchronously executing creative generator and trafficking workflows and components therefor.

DESCRIPTION OF RELATED ART

Existing solutions for generating and trafficking creatives involve processes that are variable and require different levels of effort and cost, as well as significant interaction through the use of several tools. Creative content providers would like to hedge their goals across different and new creative types and campaigns, but existing technology limits their ability to do so. Backend, foundational infrastructure for performing such functionality is lacking. One challenge in developing such an infrastructure lies in the lack of technology capable of generating creative content based on a minimal number of input signals.

There is a need for technology that provides the connections and interplay between the functional components through which data and content associated with different types of creatives can flow and be processed efficiently. Performing existing processes using conventional functional components and pipelines becomes a significant engineering challenge in view of failure modes, recovery options, retries, notifications and the like. In addition, significant engineering challenges have prohibited the extent to which the workflows in the pipeline can be automated.

One solution for managing failure modes and recovering asynchronously (unrelated to the generation or trafficking of creatives) is provided in Garcia-Molina, H., "SAGAS", Dept. of Comp. Sci., Princeton University (1987), which describes long lived transactions (LLTs) and the notion of a so-called "Saga" that has been developed for database management systems where an LLT is a Saga if it can be written as a sequence of transactions that can be interleaved with other transactions. This database management system attempts to guarantee that either all the transactions in a Saga are successfully completed or compensating transactions are run to amend a partial execution. A Saga is generally known as a set of rules for routing a job to multiple collaborating parties, and allowing these parties to backtrack and/or take corrective action in the case of failure. In other words, Saga is a concept which describes how a system should manage potential errors.

Although this technique has many advantages, it may offer challenges when applied to automating every layer of an automated creative generation and trafficking system. Given the above-mentioned challenges, it has been realized that there is a need for improved, automatic handling of workflows involved in the generation and trafficking of creatives, as well as improved components therefor.

BRIEF DESCRIPTION

In an example embodiment, a creative development platform is provided. The creative development platform includes an input interface configured to receive input data defining one or more creative properties. A workflow definition store stores creative generation workflow definitions, each of the workflow definitions defining a workflow related to generating a creative. A creative generation server is communicatively coupled to the input interface and the workflow definitions store and is operable to: receive the input data; retrieve at least one of the creative generation workflow definitions from the workflow definition store based on the input data; generate the creative containing one or more media objects based on the input data and using the at least one workflow definition. A network communications device communicates the creative to a target devices.

In some embodiments, the creative development platform includes a worker store containing one or more workers; a message queue configured to communicate commands to the one or more workers, where the commands provide instructions to the one or more workers to perform one or more predetermined tasks associated with generating the creative. Upon completion of the one or more predetermined tasks the one or more workers communicates back to the pipeline manager via the message queue a message indicating the one or more predetermined tasks have met a predefined definition of success. In some embodiments, the creative development platform further includes a pipeline manager communicatively coupled to the message queue and configured to determine a next step for the one or more workers based on a corresponding workflow definition of the workflow definitions. In some embodiments, when the one or more workers encounters a field that requires input and the input is not available, the one or more workers bypass the field.

In some embodiments, the creative development platform includes a voiceover request processor operable to perform a voiceover approval process. In addition, the workflow definition store further stores a voiceover workflow definition which when executed by the voiceover request processor causes the voiceover request processor to perform a voiceover approval process. In some embodiments, the voiceover approval process is executed with at least two workflow definitions of the workflow definitions executed asynchronously.

In some embodiments, the creative development platform further includes an asset database that stores media objects. In addition, the workflow definitions are further operable to store a mixing workflow that when executed by a corresponding worker of the one or more workers, causes the corresponding worker to mix a component identifier with a media object retrieved from the asset database.

In an alternative embodiments, a computer-implemented creative development method is provided, including the steps of: receiving input data defining one or more creative properties; storing, in a workflow definition store, creative generation workflow definitions, each of the workflow definitions defining a workflow related to generating a creative; receiving the input data; retrieving at least one of the creative generation workflow definitions from the workflow definition store based on the input data; generating the creative containing one or more media objects based on the input data and using the at least one workflow definition; and communicating the creative to target devices.

In some embodiments, the method includes storing one or more workers; communicating commands to the one or more workers, the commands providing instructions to the one or more workers to perform one or more predetermined tasks associated with generating the creative. Upon completion of the one or more predetermined tasks the one or more workers communicates back to the pipeline manager via the message queue a message indicating the one or more predetermined tasks have met a predefined definition of success.

In some embodiments, the method includes determining a next step for the one or more workers based on a corresponding workflow definition of the workflow definitions. In some embodiments, the method also includes bypassing a field that requires input and the input is not available. In some embodiments, the method further includes executing a voiceover workflow definition to perform a voiceover approval process. In some embodiments, the voiceover approval process is executed with at least two workflow definitions of the plurality of workflow definitions executed asynchronously.

In some embodiments, the further includes storing media objects; and storing a mixing workflow that when executed by a corresponding worker of the one or more workers, causes the corresponding worker to mix a component identifier with a media object.

In an alternative embodiments, there is provided a non-transitory computer-readable medium having stored thereon one or more sequences of instructions for causing one or more processors to perform any one or a combination of the methods described herein.

BRIEF DESCRIPTION OF THE DRAWINGS

The features and advantages of the example embodiments of the invention presented herein will become more apparent from the detailed description set forth below when taken in conjunction with the following drawings.

DESCRIPTION

Figure 1:
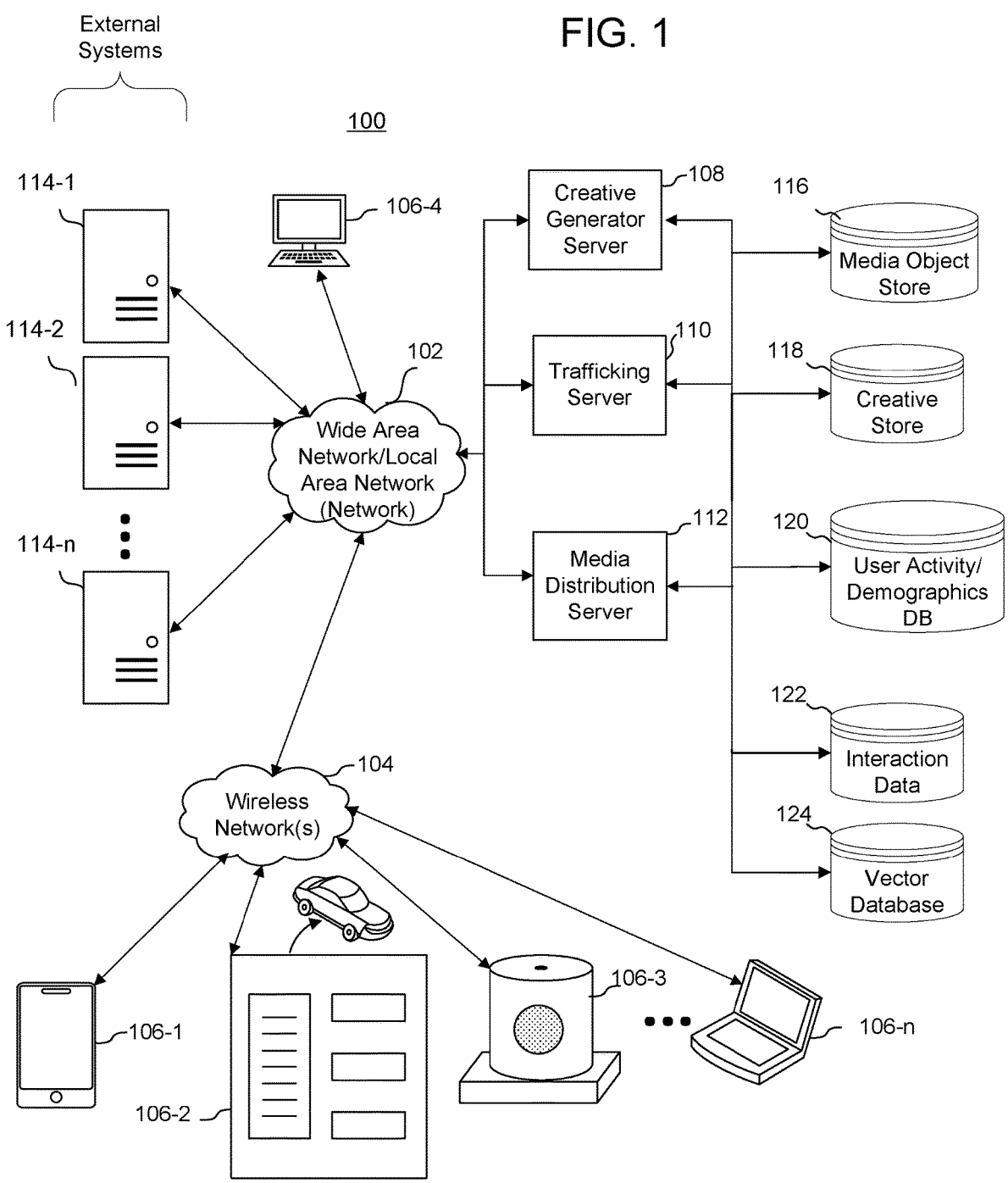
FIG. 1 illustrates an example system for generating and trafficking creatives.

FIG. 1 illustrates an example system for generating and trafficking creatives. Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result. System 100 of FIG. 1 includes wide area networks/local area networks ("LANs/WANs")—(Network) 102, wireless network(s) 104, client devices 106-1, 106-2, 106-3, 106-4, . . . , 106-n (referred to collectively and individually as client device 106), a creative generator server 108, a trafficking server 110, a media distribution server 112 and one or more external systems 114-1, 114-2, . . . , 114-n (referred to collectively and individually as an external system 114).

Wireless network 104 is configured to communicatively couple client devices 106 and their components with network 102. Wireless network 104 may include any of a variety of wireless sub-networks that may further overlay stand-alone ad-hoc networks, and the like, to provide an infrastructure-oriented connection for client devices 106. Such sub-networks may include mesh networks, wireless LAN (WLAN) networks, cellular networks, and the like. Other now or future known types of access points may be used in place of network 102 and wireless network 104.

Generally, the creative generator server 108 and trafficking server 110 cooperatively operate to generate and traffic creatives. In some examples, a creative is in the form of a media content item. For simplicity as used herein, a creative media content time is sometimes simply referred to as a creative. Input specifying criteria for a creative is input via an input interface of an external system 114. In an example, embodiment, the input is provided to external system 114 via a client device 106 (e.g., client interface 106-4. In turn, the input is communicated to creative generator server 108 (via, e.g., WAN/LAN 102). Creative generator server 108 receives the input through from the network (e.g., WAN/LAN 102) and executes creative generation applications asynchronously. Trafficking server 110 executes trafficking workflows asynchronously for the purpose of communicating the creatives generated by creative generator server 108 to targeted media-playback devices. Each creative is, in turn, communicated through network 102 to a client device 106 that has been targeted to receive the creative. The client device 106, in turn, plays the creative.

System 100 also includes a media object store 116 that stores media objects, a creative store 118 that stores creatives that have been generated by creative generator server 108, a user activity/demographics database 120 that stores user activity and demographic data, an interaction database 122 that stores activity profiles associated with accounts (e.g., of users), and a vector database 124 that stores vectors in accordance with the embodiments described herein.

In one example embodiment there is provided an automated creative development platform that performs asynchronous execution of creative generation workflows and trafficking workflows via a message queue. The platform includes creative platform components that operate according to custom workflow definitions to manage such creative generation and trafficking workflows during execution. A workflow definition represents a process and describes the tasks involved in the process. Workflow definitions can include properties, events, methods, protocols, indexers, and the like. A workflow can be defined for one specialized component. In some embodiments a workflow can be defined for more than one specialized component. A specialized component can have multiple workflow definitions. The two workflows can reflect two different processes the specialized component can perform. In some embodiments, a specialized component can be involved in more than one workflow at a time. In some embodiments, the workflows can operate asynchronously.

The following non-limiting examples are described in terms of generating a creative that includes audio objects that have been previously stored in media object store 116. This description is not intended to limit the application of the example embodiments. In fact, after reading the following description, it will be apparent to one skilled in the relevant art(s) how to implement the following example embodiments in alternative embodiments. For example, by extending the platform to generate and traffic unique targeted creatives containing other types of media objects (e.g., video, text, etc.) in a variety of formats, and whether stored in media object store 116 or provided from a different source.

Figure 2:
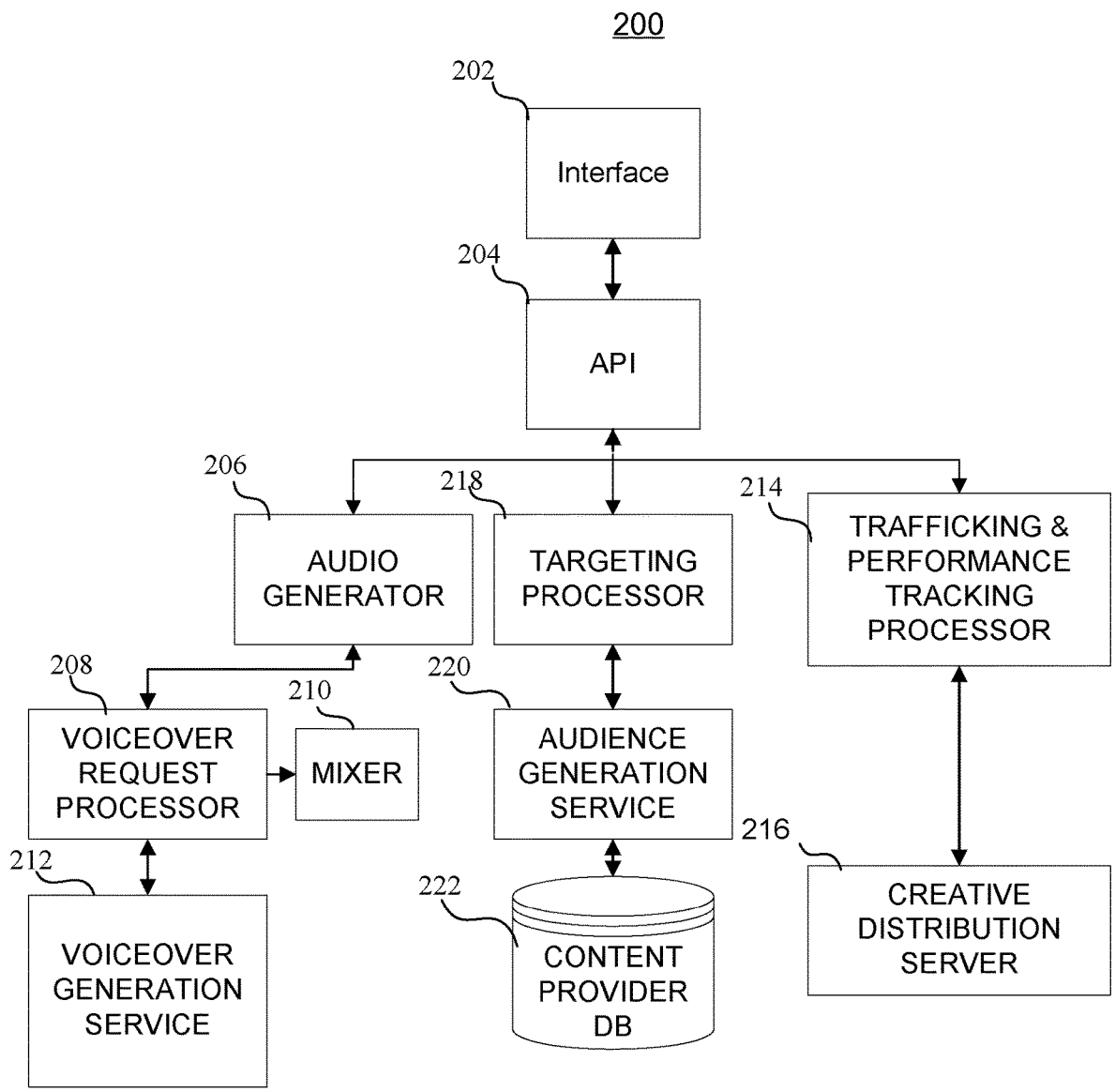
FIG. 2 illustrates a block diagram of an exemplary creative development platform including the applications executed by a creative generator server and a creative trafficking server.

FIG. 2 illustrates a block diagram of an exemplary creative development platform 200 including the creative platform components executed by the creative generator server 108 (FIG. 1) and creative trafficking server 110 (FIG. 1). In an example embodiment, creative platform components include an audio generator 206, a voice request processor 208, a mixer 210, and voiceover generation service 212. Creative platform components also can include a targeting processor 218, audience generation service 220, and a content provider database 222. Creative platform components also can include a trafficking and performance tracking processor 214 and a creative distribution server 216. The features and advantages of the creative platform components presented herein will become more apparent from the detailed description set forth below when taken in conjunction with the respective drawings.

An interface 202 contains definitions used to mediate the exchange of information between the creative platform components of creative development platform 200 as well as external systems 114 (FIG. 1) that can provide external sources of data (i.e., data that is external to creative development platform 200).

In some embodiments, input interface 202 provides a control configured to receive input data to modify the definitions. In some embodiments, the control can take the form of a user interface (UI) designed into a device with which a person may interact. This can include display screens, keyboards, and/or a mouse or other input device that allow a user to interacts with the interface 202 to modify the workflow definitions or applicable data. The modification to the workflow definitions, in turn, generate modified workflow definitions that are used to generate one or more creatives having specified properties. In some embodiments, such modifications to the workflow definitions modify the traffic properties that define how the creative is trafficked. For example, input interface 202 can be configured to adjust input data through the use of an editor that receives input to vary the individual properties of the input data (e.g., data elements originally entered via input interface 202, such as tone, rhythm, etc.).

In one non-limiting example, input interface 202 can receive description information that contains data elements (e.g., attributes) describing a particular deliverable (e.g., targeted creative). The input is saved as one or more creative input objects containing data elements defining a particular deliverable.

In some embodiments, the input data can be provided through input interface 202 includes, for example, background media content, a script for s voiceover, a tone of s voiceover, one or more targeting parameters, one or more timing parameters. Examples of such information includes a name of a song or track identifier (ID), voiceover script ID, emotional tone and rhythm, time(s) and date(s), images, and other metadata, correspondingly.

With reference to both FIGS. 1 and 2, in some embodiments, creative development platform 200 includes an application programming interface (API) 204 that processes the data provided from/to the interface 202. As shown in FIG. 2, API 204 is between the input interface 202 and various creative platform components of platform 200 (e.g., servers and functions those servers perform) that in conjunction are used to generate a creative containing media objects such as images, an audio segments, and/or video clips, automatically.

The parameters of the input data are processed by the corresponding creative platform components of creative development platform 200. Different kinds of targeted requests, for example, have respective flows. In addition, these different sequential steps are performed on the input data. Such creative platform components perform: mixing, transcoding, sending emails, and the like. Together the creative platform components of creative development platform 200 generate a creative in the form of a targeted media content item.

Example aspects provide a definition of the workflow and workers that perform the various steps within the workflow. Workflows are processed by workers which are programs that interact with processors that coordinate work across components of the creative development platform 200 to get tasks, process them, and return their results. A worker implements an application processing step. In some embodiments, the workflows executed by the workers provide recovery mechanisms, retry mechanisms, and notification mechanisms.

Each function described above in connection with FIG. 2 is automated. Automation is used, for example, to create the parameters that are incorporated in the creative, to generate audio, and to control trafficking.

Each of the steps of a workflow is performed by the various functions is performed asynchronously. As such, one function flow is not waiting for the result of another function flow. Once a series of steps are initiated those steps are performed in the background by the workers. A view of the output (i.e., a view of a media object) is returned via an interface. Optionally a view of the output is returned via an interface at each step. If necessary, a notification is issued (e.g., via an interface) requesting additional input. The individual workflows are performed asynchronously. A responses initiated within each flow (e.g., a notification or request for additional information) that are communicated through, for example, the interface, are synchronous.

The example embodiments execute a number of workflows depending on the input they receive. For example various types of input can be received through the interface. Depending on the type of input, a different workflow is performed. For example, if a media content item or location of a media content item (e.g., a background track) is input, one workflow is performed. If no such input is received, then another workflow is performed, for example, which either requests or otherwise obtains a different type of input.

In an example embodiment, logic determines, based on some combination of inputs, a particular flow that should be implemented. Each flow returns a result (e.g., a return value such as a Boolean value). If each step is successful (as defined by a predetermined measure of success), the worker returns a success message, and the manager for the entire flow or pipeline knows to step the media object (e.g., an audio advertisement to be transmitted) to its next successful state based on the workflow definition. If a failure during the flow occurs, the individual workflow can handle the failure mode itself. In some embodiments, the workflow may not be capable of resolving the failure mode but, according to a corresponding workflow definition may be arranged to retry a sequence of steps. In other words, the workflow, workflow definition and type of error dictate the response and output. For example, if the cause of the failure mode is the workflow itself, the workflow definition may have a solution to the failure that caused the failure mode. In some embodiments, a first workflow may be expecting data from another component of the system and not receive it in a timely manner. In one non-limiting example, the first workflow can continue moving forward through its steps without waiting for the data to be prepared e.g., by a second workflow because the data needed by the first workflow is still being prepared by the second workflow and may take additional time to prepare.

In an example embodiment, each independent routine, e.g., waiting for a voiceover, generating a new voiceover project, mixing, and trafficking are workers in the pipeline manager. Every worker has a defined logic that it performs. A mixing worker, for example, calls scripts that perform certain functionality. If the mixing worker performs the scripts successfully, the mixing worker causes a mixed media object (e.g., audio advertisement) to be stored in memory so that it can, in turn, be accessed for other steps and returns a message indicating that it executed its flow successfully. If for example, the mixing worker performs a script that fails, then the mixing worker returns a message or value indicating that it has failed.

Every worker also has its own definition for what is successful. In the case of a mixing worker, for example, if an internal process in the mixing stage has determined that an internal stage has failed (e.g., a voiceover is silent indicating that the voiceover mixing has failed), then the mixing worker returns a message indicating that the mixing stage has failed. Every worker has its own definition of what is successful and what is a failure.

Example embodiments described herein can also provide automated routing and failure (e.g., retries) and recovery handling (e.g., fallback). In addition, the embodiments allow the various functions to be modular and for different workflows to be defined. If one worker fails, the logic for how it would fallback is dependent on the type failure. Each worker can thus be performed more than one time safely.

In an exemplary embodiment, the individual creative platform components may not be part of a sequential workflow. In other words, they do not know that they are going to flow at all, they just know that they might being called. This allows the manager to be untethered to any particular workflow.

Pipeline manager is given all of the workers and workflow definitions. The pipeline manager, using the workflow definitions executes the workers in sequence and manages predefined successes and failures.

Figure 3:
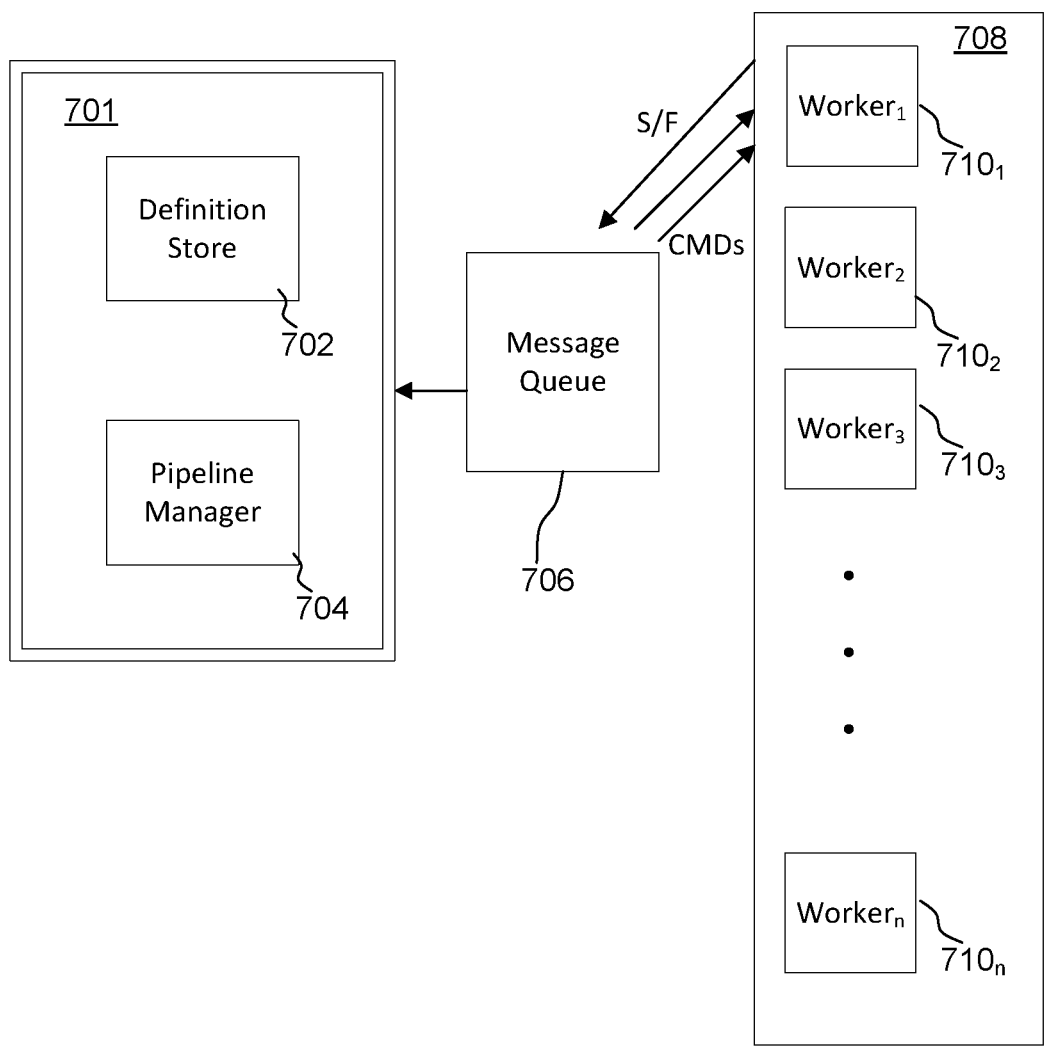
FIG. 3 is a diagram illustrating a system for automating the generation of a creative in accordance with an example embodiment of the present invention.

FIG. 3 is a diagram illustrating a system for automating the generation of a creative in accordance with an example embodiment of the present invention. A service 701 contains a workflow definition store 702 and a pipeline manager 704. A worker store 708 containing workers 710$_1$, 710$_2$, 710$_3$, . . . , 710$_n$ (e.g., Worker$_1$, Worker$_2$, Worker$_3$, . . . , Worker$_n$) (each individually and collectively 710) resides independently from service 701. A message queue 706 that performs routing is communicatively coupled to the service 701 and the worker store 708. Commands (CMDs) are communicated by the message queue 706 to the workers 710 to instruct the workers 710 to perform predetermined tasks. In return, the workers 710 communicate back to the pipeline manager 704 via message queue 706 a message indicating whether the task they performed was a success or failure (S/F). In turn, the pipeline manager 704 determines the next step based on a workflow definition stored in workflow definition store 702. In one example embodiment, the pipeline manager 704 does not hold the logic, but rather communicate through the message queue 706 to instruct the workers to perform tasks. In this embodiment at least one custom workflow definition is used. In addition, asynchronous execution via the message queue is performed.

In an example embodiment, at least a portion of the metadata used to generate a creative is stored in a database prior to the creative generation process. Metadata includes assets that are available to each worker. There can be exceptions. For example, additional information can be added by a workflow. As part of the idempotent nature of the workers, for example, if one encounters a field that requires input and the information is not necessary, the worker will bypass (e.g., ignore) that missing field. Thus, with exceptions, metadata is available at the start of the creative process.

Figure 4:
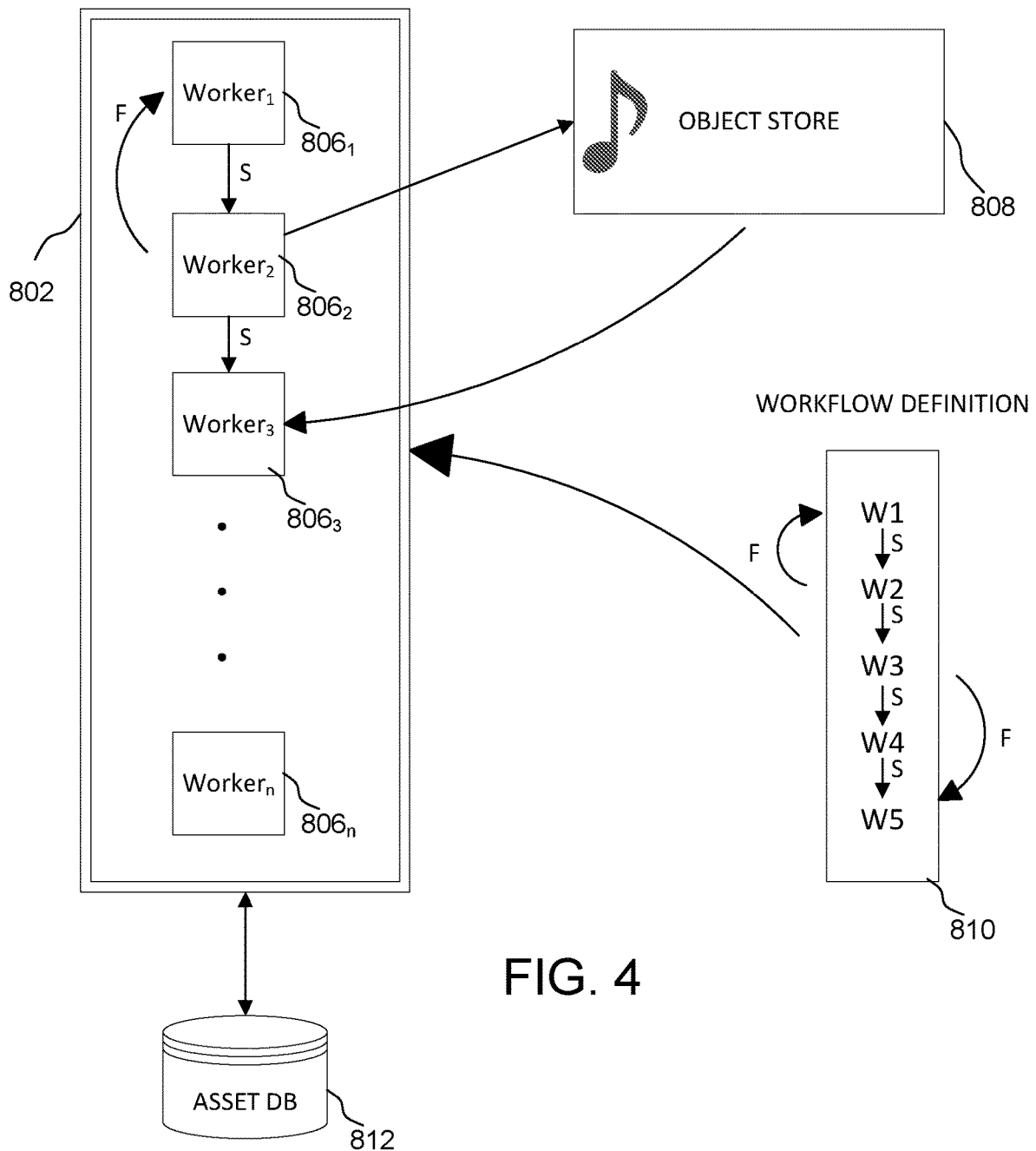
FIG. 4 is a diagram illustrating a system for automating the generation of a creative in accordance with an example embodiment of the present invention.

FIG. 4 is a diagram illustrating a system for automating the generation of a creative in accordance with an example embodiment of the present invention. Referring to FIG. 4, assets can be stored in asset database 812 and made available to the workers 806$_1$, 806$_2$, 806$_3$, . . . , 806$_n$ (e.g., Worker$_1$, Worker$_2$, Worker$_3$, . . . , Worker$_n$)(each individually and collectively 806). In addition predefined component identifiers can be prestored in an object store 808. Asset database 812 (or asset store 812) can be configured to have plural buckets that store media objects. A workflow definition 810 is called to execute a task.

In an example implementation, a mixing workflow mixes a component identifier that has been predefined and stored in object store 808 with a media object stored in asset database 812 and made available to each worker 806 (e.g., Worker$_1$, Worker$_2$, Worker$_2$, . . . Worker$_n$) in case a worker needs to use it. For example, if a worker is in charge of mixing an audio component identifier stored in object store 808 with a media object, the mixing workflow can mix the audio component identifier and the media object and store in asset database 812 (e.g., in a bucket) and make available to the workers the mix of the media object and the component identifier.

In one embodiment, a failure mode cause system 200 to repeat workflows. This is accomplished by making each workflow idempotent. An idempotent workflow is a workflow that produces the same results if executed once or multiple times. This configuration avoids the need to undo any of the work that has already been done by the workflows in the event of a failure. In other words, an operation can be repeated or retried as often as necessary without causing unintended effects while avoiding the need to keep track of whether the operation was already performed or not.

A workflow definition 810 can be performed more than one time until the correct results are achieved. An attempt can be made to, for example, to perform a workflow definition 810 that traffics a creative more than one time without actually releasing the creative. Similarly, an attempt to perform a workflow that calculates or communicates billing information can be performed more than one time. In yet another aspect, an attempt to perform a workflow that mixes audio more than one time can be performed.

The example pipeline flow definition code can be stored in memory. The pipeline manager has a pool of threads that are available to perform work and available internally. The pipeline manager manages execution of plural threads that communicate messages to a corresponding worker. The worker returns a result. Based on the result, the manager references the applicable workflow definition, choose the next step and passes the work to the next worker via another thread. In an example embodiment, this is accomplished by placing messages onto the message queue. The system is thus asynchronous. The message queue allows the system to be scalable and distributable. Thus several systems of workers can be created independently thereby eliminating the need to limit the workers to a predetermined number threads (e.g., a initiate command that initiates the generation of creative, a boost command that causes creatives associated with a predetermined object to be generated).

Figure 5:
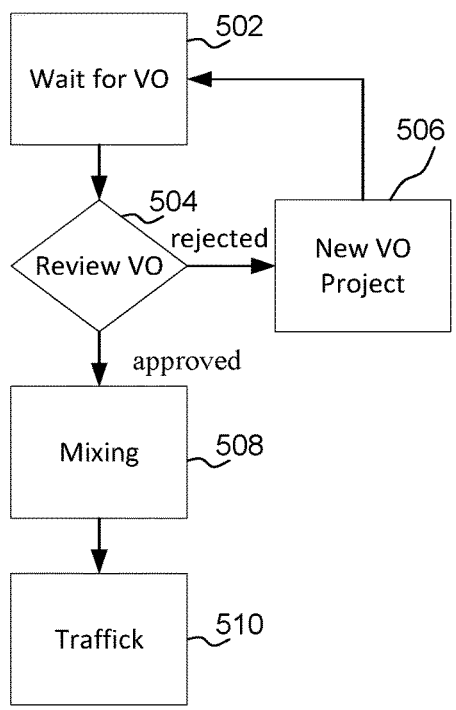
FIG. 5 illustrates an exemplary voiceover workflow definition for a voiceover approval process which can be executed with other workflows asynchronously.

FIG. 5 illustrates an exemplary voiceover workflow definition for a voiceover approval process which can be executed with other workflows asynchronously. Referring again to FIG. 2, this process can be performed automatically by, for example, voiceover request processor 208. In block 502, the process waits for a voiceover. Once the voiceover is received, in block 504, the voiceover is reviewed and a determination is made as to whether the voiceover is approved or rejected. If a determination is made in block 504 that the voiceover is rejected, a new voiceover project is generated as shown in block 506. If a determination is made in block 504 that the voiceover is approved, then in block 508 the voiceover is mixed by mixer 210 and in block 510 trafficking and performance tracking processor 214 and creative distribution server 216 traffic the voiceover to targeted devices (e.g., client devices 106) on a network such as wireless network 104.

Figure 6:
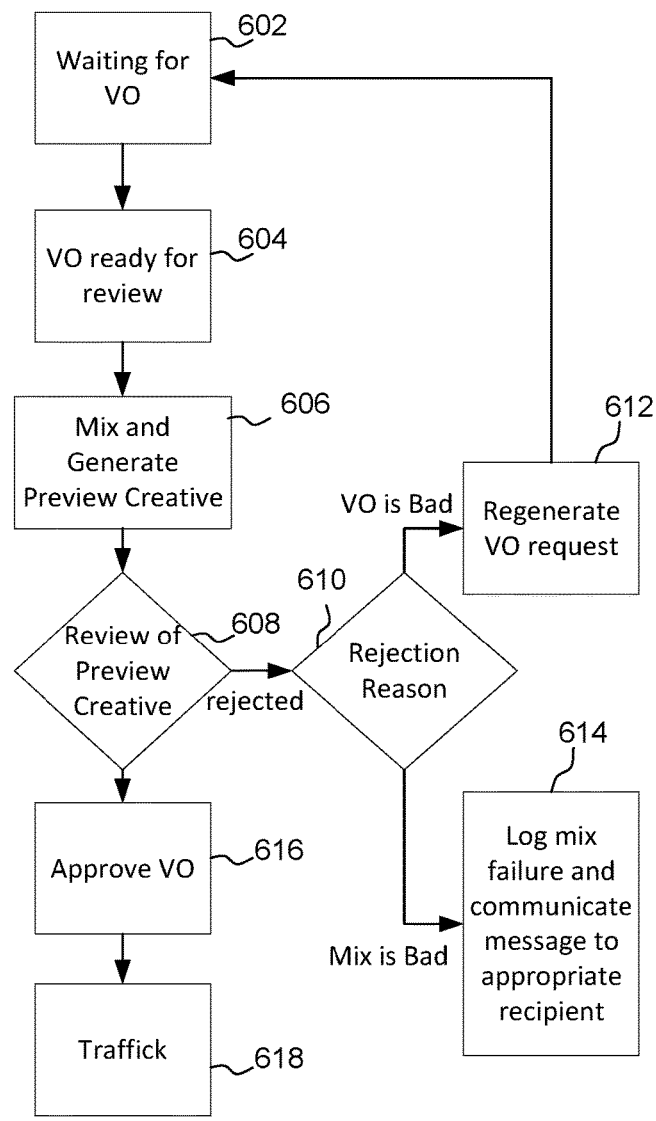
FIG. 6 illustrates another exemplary voiceover workflow definition for a voiceover approval process which can be executed by a voiceover request processor and mixer with other workflows asynchronously.

FIG. 6 illustrates another exemplary voiceover workflow definition for a voiceover approval process which can be executed by voiceover request processor 208 and mixer 210 with other workflows asynchronously. In block 602, the process waits for a voiceover. Once the voiceover is received, in block 604 the voiceover is queued for review. At block 606 the voiceover is mixed and a preview creative is generated. A review of the preview creative is performed at block 608 and a determination is made as to whether the preview creative is rejected or approved. If rejected, then a determination is made at block 610 as to the reason for the rejection. For example, if the reason is because the voiceover does not meet a particular criteria thereby indicating the voiceover is bad, then at block 612 the voiceover request is regenerated and the flow returns to block 602. If the determination made at block 610 that the mixing process does not meet a predetermined criteria, then this mix failure is logged and a message is communicated to the appropriate component associated with the project indicating this, as shown in block 614. For example, a message providing the log can be transmitted to the party responsible for the project. If a determination is made at block 608 that the preview creative is approved, then the preview creative is approved by an approval process, as shown 616. Once approved, at block 618 the final mix is trafficked, by creative distribution server 216 of FIG. 1, for example, at the direction of the trafficking processor 214.

Content can be stored in content provider database 222. As will be described below in more detail a targeting processor 218 operates to determine target audiences. In some embodiments, the target processor 218 operates in conjunction with an audience generation service 220 which in turn is supplied content provided by a content provider whose content is stored in content provider DB 222.

Block 504 of FIG. 5 and block 616 of FIG. 6 will now be described in more detail with reference to FIG. 2. Audio data that includes speech may be transcribed by a voice transcriber which operates under the control of the voiceover generation service 212 of FIG. 2 using a language model. The transcription may be provided to a voiceover review processor (not shown) which operates under the control of the voiceover generation service 212 of FIG. 2. In turn, voice over review processor may provide feedback on the transcription. In some embodiments, the language model may be updated based at least in part on the feedback. The feedback from the voiceover review processor may include, for example, an affirmation of the transcription; a disapproval of the transcription; a correction to the transcription; a selection of an alternate transcription result; or any other kind of response.

An automated grammar generator (not shown) also under the control of the voice generation service 212 of FIG. 2 can be used to correct, revise or replace the proposed voiceover. In some embodiments, the automated grammar generator identifies one or more parts of the voiceover suitable for processing into a natural language expression. The natural language expression is an expression which a person might use to refer to the segment. The automatic grammar generator generates one or more phrases from the segment, each of the one or more phrases corresponding to or capable of it being processed into a natural language expression or utterance suitable for referencing the text or speech segment. Noun phrases and verb phrases and other syntactic structures are identified in the speech or text segment, and modified to produce typical natural language expressions or utterances a user might employ to reference a segment. Verbs in verb phrases may be modified in order to provide further natural language expressions or utterances for use in the grammar. The natural language expressions thus generated may be included in grammars or language models to produce models for recognition using an automatic speech recognizer in a spoken language interface.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A creative development platform, comprising:
an input interface configured to receive input data defining one or more properties of a creative to be generated;
a worker store configured to store a plurality of workers;
a voiceover request processor-configured to perform a voiceover approval process;
a workflow definition store configured to store:
a plurality of workflow definitions, each of the plurality of workflow definitions defining a workflow of tasks related to generating a specific type of creative,
the plurality of workflow definitions including at least a voiceover workflow definition which when executed by the voiceover request processor causes the voiceover request processor to perform the voiceover approval process including rejecting or approving a voiceover to be included in the creative;
a creative generation server, communicatively coupled to the input interface, the worker store, the voiceover request processor, and the workflow definition store, operable to:
receive, from the input interface, the input data, wherein the one or more properties defined by the input data include a media object to be included in the creative, and a type of the creative to be generated is identified based, at least in part, on the media object to be included in the creative;
retrieve, from the workflow definition store, the voiceover workflow definition and another workflow definition from the plurality of workflow definitions that defines a workflow of one or more tasks related to generating the identified type of the creative other than the voiceover approval process;
generate the creative based on the input data and using the retrieved voiceover workflow definition and the other workflow definition, wherein to generate the creative, a pipeline manager associated with the creative generation server uses the retrieved voiceover workflow definition and the other workflow definition to cause asynchronous execution of a plurality of tasks related to generating the identified type of the creative by one or more of the plurality of workers defined in the retrieved voiceover workflow definition and the other workflow definition to perform each of the plurality of tasks;
a message queue through which the pipeline manager communicates with the plurality of workers, the message queue configured to transmit a plurality of commands to the one or more of the plurality of workers that provide instructions to perform the plurality of tasks related to generating the identified type of the creative, wherein upon completion of each task of the plurality of tasks, the one or more of the plurality of workers transmits back to the pipeline manager via the message queue a message indicating the respective task has met a predefined definition of success; and
a network communications device operable to transmit the generated creative to a plurality of target devices.

2. The creative development platform according to claim 1, wherein upon receiving the message indicating the respective task has met a predefined definition of success, the pipeline manager further determines a next task for execution by the one or more of the plurality of workers to perform based on the retrieved workflow definition.

3. The creative development platform according to claim 1, wherein when the one or more of the plurality of workers encounter a field that requires input and the input is not available, the one or more workers bypass the field.

4. The creative development platform according to claim 1, wherein the voiceover approval process is executed with at least two workflow definitions of the plurality of workflow definitions executed asynchronously.

5. The creative development platform according to claim 1, further comprising:
   an asset database configured to store a plurality of media objects; and
   the workflow definition store further configured to store a workflow definition defining a mixing workflow that when executed by a corresponding at least one worker from the plurality of workers, causes the corresponding at least one worker to mix a component identifier with a media object retrieved from the asset database.

6. The creative development platform of claim 1, wherein the media object is (i) an audio-type media object, (ii) an image-tuype media object (iii) a video-type media object, (iv) a text-type media object, or (v) any combination thereof.

7. A computer-implemented creative development method, comprising the steps of:
   storing, in a worker store, a plurality of workers;
   storing, in a workflow definition store:
      a plurality of workflow definitions, each of the plurality of workflow definitions defining a workflow of tasks related to generating a specific type of creative,
      the plurality of workflow definitions including at least a voiceover workflow definition for performing a voiceover approval process including rejecting or approving a voiceover to be included in the creative;
   receiving input data defining one or more properties of a creative to be generated, the one or more properties including a media object to be included in the creative, wherein a type of the creative to be generated is identified based, at least in part, on the media object to be included in the creative;
   retrieving, from the workflow definition store, the voiceover workflow definition and another workflow definition from the plurality of workflow definitions that defines a workflow of one or more tasks related to generating the identified type of the creative other than the voiceover approval process;
   based on the input data, generating the creative retrieved voiceover workflow definition and the other workflow definition to cause asynchronous execution of a plurality of tasks related to generating the identified type of the creative by one or more of the plurality of workers defined in the retrieved voiceover workflow definition and the other workflow definition to perform each task, the generating comprising:
      transmitting, via a message queue, a plurality of commands to the one or more of the plurality of workers that provide instructions to perform the plurality of tasks related to generating the identified type of the creative, and
      upon completion of each task, receiving, via the message queue, a message from the one or more of the plurality of workers indicating the respective task has met a predefined definition of success; and
   transmitting the generated creative to a plurality of target devices.

8. The method according to claim 7, further comprising the step of:
   upon receiving the message from the one or more of the plurality of workers indicating the respective task has met a predefined definition of success, determining a next task for execution by the one or more of the plurality of workers to perform based on the retrieved workflow definition.

9. The method according to claim 7, wherein when the one or more of the plurality of workers are performing, responsive to the plurality of commands, the one or more tasks related to generating the identified type of the creative, and the one or more of the plurality of workers encounter a field that requires input and the input is not available, the one or more of the plurality of workers bypass the field.

10. The method according to claim 7, wherein the voiceover approval process is executed with at least two workflow definitions of the plurality of workflow definitions executed asynchronously.

11. The method according to claim 7, further comprising the steps of:
   storing a plurality of media objects; and
   storing a workflow definition defining a mixing workflow that when executed by a corresponding at least one worker from the plurality of workers, causes the corresponding at least one worker to mix a component identifier with a media object from the plurality of media objects.

12. The computer-implemented creative development method of claim 7, wherein the media object is (i) an audio-type media object, (ii) an image-type media object, (iii) a video-type media object, (iv) a text-type media object, or (iv) any combination thereof.

13. A non-transitory computer-readable medium having stored thereon one or more sequences of instructions for causing one or more processors to perform steps of:
   storing, in a worker store, a plurality of workers;
   storing, in a workflow definition store:
      a plurality of workflow definitions, each of the plurality of workflow definitions defining a workflow of tasks related to generating a specific type of creative,
      the plurality of workflow definitions including at least a voiceover workflow definition for performing a voiceover approval process including rejecting or approving a voiceover to be included in the creative;
   receiving input data defining one or more properties of a creative to be generated, the one or more properties including a media object to be included in the creative, wherein a type of the creative to be generated is identified based, at least in part, on the media object to be included in the creative;
   retrieving, from the workflow definition store, the voiceover workflow definition and another workflow definition from the plurality of workflow definitions that defines a workflow of one or more tasks related to generating the identified type of the creative other than the voiceover approval process;
   based on the input data, generating the creative retrieved voiceover workflow definition and the other workflow definition to cause asynchronous execution of the one or more tasks related to generating the identified type of the creative by one or more of the plurality of workers defined in the retrieved voiceover workflow definition and the other workflow definition to perform each task, the generating comprising:
      transmitting, via a message queue, a plurality of commands to the one or more of the plurality of workers that provide instructions to perform the plurality of tasks related to generating the identified type of the creative, and
      upon completion of each task, receiving, via the message queue, a message from the one or more of the plurality of workers indicating the respective task has met a predefined definition of success; and transmitting the generated creative to a plurality of target devices.

14. The non-transitory computer-readable medium of claim 13, further having stored thereon a sequence of instructions for causing the one or more processors to perform steps of:

upon receiving the message from the one or more of the plurality of workers indicating the respective task has met a predefined definition of success, determining a next task for execution by the one or more of the plurality of workers to perform based on the retrieved workflow definition.

15. The non-transitory computer-readable medium of claim 13, wherein when the one or more of the plurality of workers are performing, responsive to the plurality of commands, the one or more tasks related to generating the identified type of the creative, and the one or more of the plurality of workers encounter a field that requires input and the input is not available, the one or more of the plurality of workers bypass the field.

16. The non-transitory computer-readable medium of claim 13, wherein the voiceover approval process is executed with at least two workflow definitions of the plurality of workflow definitions executed asynchronously.

17. The non-transitory computer-readable medium of claim 13, further having stored thereon a sequence of instructions for causing the one or more processors to perform steps of:

storing a plurality of media objects; and storing a workflow definition defining a mixing workflow that when executed by a corresponding at least one worker from the plurality of workers, causes the corresponding at least one worker to mix a component identifier with a media object from the plurality of media objects.

* * * * *

UNITED STATES PATENT AND TRADEMARK OFFICE
CERTIFICATE OF CORRECTION

PATENT NO. : 11,537,428 B2
APPLICATION NO. : 16/414368
DATED : December 27, 2022
INVENTOR(S) : Stacey Ling-Fun Wallace et al.

It is certified that error appears in the above-identified patent and that said Letters Patent is hereby corrected as shown below:

In the Claims

In Claim 6, Column 13, Line 19, "image-tuype" should read "image-type".

Signed and Sealed this
Fourteenth Day of March, 2023

Katherine Kelly Vidal
*Director of the United States Patent and Trademark Office*